United States Patent
Barbier et al.

(10) Patent No.: US 12,522,347 B2
(45) Date of Patent: Jan. 13, 2026

(54) HYDRAULIC CONTROL CIRCUIT FOR CONTROLLING FAN BLADE PITCH

(71) Applicant: SAFRAN AIRCRAFT ENGINES, Paris (FR)

(72) Inventors: Hugues Barbier, Moissy-Cramayel (FR); Sébastien Oriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/721,701

(22) PCT Filed: Dec. 20, 2022

(86) PCT No.: PCT/FR2022/052433
§ 371 (c)(1),
(2) Date: Jun. 19, 2024

(87) PCT Pub. No.: WO2023/118725
PCT Pub. Date: Jun. 29, 2023

(65) Prior Publication Data
US 2025/0051004 A1 Feb. 13, 2025

(30) Foreign Application Priority Data
Dec. 23, 2021 (FR) ................................. 2114428

(51) Int. Cl.
*B64C 11/38* (2006.01)
*F04B 1/324* (2020.01)
*F04B 49/00* (2006.01)

(52) U.S. Cl.
CPC .............. *B64C 11/38* (2013.01); *F04B 1/324* (2013.01); *F04B 49/002* (2013.01)

(58) Field of Classification Search
CPC ........ F04B 1/295; F04B 1/324; F04B 49/002; B64C 11/30–308; B64C 11/38–42
(Continued)

(56) References Cited

U.S. PATENT DOCUMENTS 2,865,460 A * 12/1958 St. John, Jr. ............. B64C 11/40
92/13
2,928,474 A * 3/1960 Haworth .................. B64C 11/42
416/157 R
(Continued)

FOREIGN PATENT DOCUMENTS

CN 1965169 B * 2/2012 ............ F15B 15/204
EP 3179044 A1 * 6/2017 ............... F01D 7/00
(Continued)

OTHER PUBLICATIONS

International Search Report for PCT/FR2022/052433 dated Apr. 3, 2023.

*Primary Examiner* — Alexander B Comley
(74) *Attorney, Agent, or Firm* — McDonald Hopkins LLC

(57) ABSTRACT

A hydraulic control circuit of a double-acting orientation cylinder to orient fan vanes of a turbojet engine, including an oil tank, a variable-displacement axial piston pump including a swash plate controlled by a double-acting control and compensation cylinder including a control chamber and a compensation chamber, the pump being supplied by the reservoir and having the outlet thereof configured to be able to be connected, via a supply pipe, to a second chamber of the orientation cylinder, a first chamber of the orientation cylinder being connected to the tank, the chambers of the control and compensation cylinder both being pressurised with a pressure corresponding to the outlet pressure of the pump, and wherein the control and compensation chambers are arranged to increase the tilt of the plate in order to (Continued)

increase the displacement of the pump when the pressurisation pressure of these chambers increases.

5 Claims, 4 Drawing Sheets

(58) Field of Classification Search
USPC .......................... 417/222.1–222.2, 269–270
See application file for complete search history.

(56) References Cited

U.S. PATENT DOCUMENTS

| | | | | |
|---|---|---|---|---|
| 5,064,351 | A * | 11/1991 | Hamey | F04B 1/324 417/222.1 |
| 5,320,499 | A * | 6/1994 | Hamey | F04B 49/103 60/449 |
| 7,155,909 | B2 * | 1/2007 | Toji | F15B 20/008 60/468 |
| 8,277,182 | B2 * | 10/2012 | Perkinson | F01D 7/00 416/157 R |
| 8,540,188 | B2 * | 9/2013 | Nakagawa | B64C 13/42 244/99.6 |
| 9,217,446 | B2 * | 12/2015 | Ohtsuka | F15B 1/024 |
| 10,875,375 | B2 * | 12/2020 | Giovanardi | F16F 15/002 |
| 2003/0077183 | A1 * | 4/2003 | Franchet | F15B 7/10 417/357 |
| 2008/0236156 | A1 * | 10/2008 | Kakino | F15B 15/18 60/443 |
| 2009/0266934 | A1 * | 10/2009 | Makino | F04B 49/002 417/44.2 |
| 2010/0199838 | A1 * | 8/2010 | Krebs | F04B 1/2014 417/269 |
| 2014/0193261 | A1 * | 7/2014 | Frantz | B64C 11/308 416/153 |
| 2014/0366522 | A1 * | 12/2014 | Masutani | F15B 15/18 60/477 |
| 2018/0002007 | A1 * | 1/2018 | Leguay | F15B 11/165 |
| 2019/0063472 | A1 * | 2/2019 | Blanding | F04B 1/328 |

FOREIGN PATENT DOCUMENTS

| | | | | |
|---|---|---|---|---|
| FR | 2993940 | A1 * | 1/2014 | ............ F04B 23/06 |
| FR | 3011288 | A1 * | 4/2015 | ............ F04B 23/06 |
| JP | 2005036870 | A * | 2/2005 | |
| JP | 6147021 | B2 * | 6/2017 | |
| WO | WO-2013021127 | A1 * | 2/2013 | ........... B64C 11/303 |

* cited by examiner ically an example of a mecha-
HYDRAULIC CONTROL CIRCUIT FOR CONTROLLING FAN BLADE PITCH

CROSS-REFERENCE TO RELATED APPLICATIONS

This is the National Stage application of PCT international application PCT/FR2022/052433, filed on Dec. 20, 2022, which claims the priority of French Patent Application No. 2114428, filed Dec. 23, 2021, both of which are incorporated herein by reference in their entireties.

TECHNICAL FIELD

The invention relates to a system comprising a hydraulic control circuit for the setting of turbojet engine fan blades.

PRIOR ART

In a motor (a turbomachine) of the unducted turbojet engine type, such as an "open rotor" with two counter-rotating fans or even of the USF type for "Unducted Single FAN", that is to say with a single fan followed by a non-rotary blading, there is no nacelle surrounding the fan(s). The angle of incidence of the blades of a fan is adjustable by a pitch setting system generally allowing controlling the setting of all the blades at the same angle (the same pitch).

In a turbojet engine type motor, marked by 1 in FIG. 1, the air is admitted into an inlet sleeve 2 to pass through a fan including a series of rotary vanes 3 before splitting into a central primary flow and a secondary flow surrounding the primary flow.

Most current ducted turbojet engines do not comprise a system for varying the angle of incidence of the fan blades, however some studies consider such a system. The ducted turbojet is then of a type commonly referred to as VPF for "Variable Pitch Fan". The following description takes as an example the application of the hydraulic control system to the ducted turbojet engine in FIG. 1, but it is understood that the system can equally apply to an unducted turbojet.

The primary flow of the turbojet engine 1 is compressed by low pressure 4 and high pressure 5 compressors before reaching a combustion chamber 6, after which it expands by passing through a high pressure turbine 7 and a low pressure turbine 8, before being discharged by generating an auxiliary thrust. The secondary flow is, in turn, propelled directly by the fan to generate a main thrust.

Each turbine 7, 8 includes series of blades which are oriented radially and regularly spaced about an axis of rotation AX of the motor, these blades being carried by rotor elements of the motor rotating about the axis AX.

A casing 9 surrounds the vanes 3 of the fan and the entire motor to externally delimit the secondary flow. The vanes 3 of the fan can be of the variable setting type, so that the orientation of the vanes 3 about their respective radial axes can be adjusted for all these vanes. This setting adjustment is controlled depending on the operating conditions of the motor, in particular to optimise the consumption.

As represented schematically in FIG. 2, each vane 3 then includes a base 11 carried by a rotor element 12 rotating about the axis AX, by means of a pivot connection allowing it to pivot about a radial axis relative to the axis AX.

Additionally, a central shaft 13 passing through the rotor element 12 and rotating therewith includes a disc 14 provided with an external circumferential groove 16, and each base 11 includes a stud not represented which is engaged in this groove 16. A movement of the central shaft 13 with the disk 14 which it carries, along the axis AX thus allows longitudinally moving the pin of each base 11 to rotate the vane 3 about its radial axis.

FIG. 2 provides schematically an example of a mechanism among other possibilities that can be implemented, such as connecting rod-crank type systems, so that the setting of the vanes 3 depends on the longitudinal position of the central shaft 13.

Maintaining the shaft 13 at a given longitudinal position is ensured by means of a hydraulic transfer bearing 15 surrounding the shaft 13, by pressurising a first chamber 17 and a second chamber 18 of this bearing 15 at different pressures.

In the example of FIG. 2, the shaft 13 comprises a first internal channel communicating the first chamber 17 with a downstream chamber 21 of a cylinder body 22 carried by the rotor element 12 while being rigidly secured thereto. This shaft 13 also comprises a second internal channel communicating the second chamber 18 with an upstream chamber 19 of the cylinder body 22.

The upstream end of the shaft 13 is housed in the cylinder body 22, and it is terminated by a plate 23 separating the upstream chamber 19 and the downstream chamber 21 of the cylinder body 22.

In operation, the pressure difference between the first chamber 17 and the second chamber 18 is adjusted to correspond to the force exerted by the vanes 3 on the disk 14, so as to maintain the shaft 13 at a given longitudinal position, in order to block the vanes at a given setting value.

From such an balanced situation, a reduction or an increase in the pressure of one or the other of the chambers 17 and 18 allows moving the shaft 13 upstream or downstream to change the setting angle of the blades, before readjusting the changed pressure to restore a balance in order to maintain the vanes at the new setting angle thereof.

As the hydraulic transfer bearing 15 is the seat of leaks, maintaining the blades at a given setting angle requires continually hydraulically supplying the chambers 17 and 18 in order to keep them pressurised at the required pressures.

The pressurisation of chambers 17 and 18 is ensured with a hydraulic pump generating a sufficiently high nominal pressure to allow manoeuvring the blades over their entire range of setting angles. This nominal pressure, which is the highest pressure of the two chambers 17 and 18, thus corresponds to the maximum force that can be exerted by the vanes on the disc 14 according to all possible operating conditions of the motor.

In practice, the continual maintenance of the upstream and downstream chambers at high pressure values, associated with the necessary presence of leaks at the hydraulic transfer bearing, penalises the efficiency of the motor since it corresponds to an additional energy expenditure.

The aim of the invention is to provide a solution for limiting the energy loss of such a hydraulic control system for fan blade setting.

DISCLOSURE OF THE INVENTION

To this end, the invention relates to a hydraulic control circuit of a double-acting orientation cylinder to orient fan vanes of a turbojet engine, comprising an oil tank, a variable-displacement axial piston pump including a swash plate controlled by a double-acting control and compensation cylinder comprising a control chamber and a compensation chamber, the orientation cylinder having a first chamber connected to the tank, the pump being supplied by the reservoir and having the outlet thereof configured to be able to be connected to a second chamber of the orientation cylinder via a supply pipe, the chambers of the control and compensation cylinder both being pressurised with a pressure corresponding to the pump outlet pressure, and wherein the control and compensation chambers are arranged to increase the tilt of the plate in order to increase the displacement of the pump when the pressurisation pressure of these chambers increases.

Thanks to the invention, the pressure delivered by the pump is adjusted to the necessary and sufficient value to counter the forces exerted by the vanes on the double-acting cylinder, which allows significantly reducing the value of this pressure to reduce both the energy consumption of the pump and the hydraulic leaks in the circuit.

The invention also relates to a circuit thus defined, wherein the pump has the outlet thereof connected, via a supply pipe, to a dispensing valve itself connected to the first and second chambers of the orientation cylinder are connected to the dispensing valve, wherein the compensation chamber of the pump is connected to the outlet of the pump, wherein the control chamber of the pump is connected to the second chamber of the orientation cylinder, wherein the dispensing valve can occupy a position in which it connects, on the one hand, the supply pipe to the second chamber of the orientation cylinder which is connected to the control chamber of the pump, and on the other hand, the first chamber of the orientation cylinder to the tank.

The invention also relates to a circuit thus defined, wherein the dispensing valve can occupy a position in which the pump and the tank are isolated from the first and second chambers of the orientation cylinder.

The invention also relates to a circuit thus defined, comprising a bleed pipe connecting the supply pipe to the tank via a check valve.

The invention also relates to a circuit thus defined, in which the control chamber has a larger useful section than the compensation chamber.

The invention also relates to a turbojet engine comprising a circuit thus defined and variable-setting fan blades which are controlled with this circuit.

DESCRIPTION OF THE EMBODIMENTS

Figure 1:
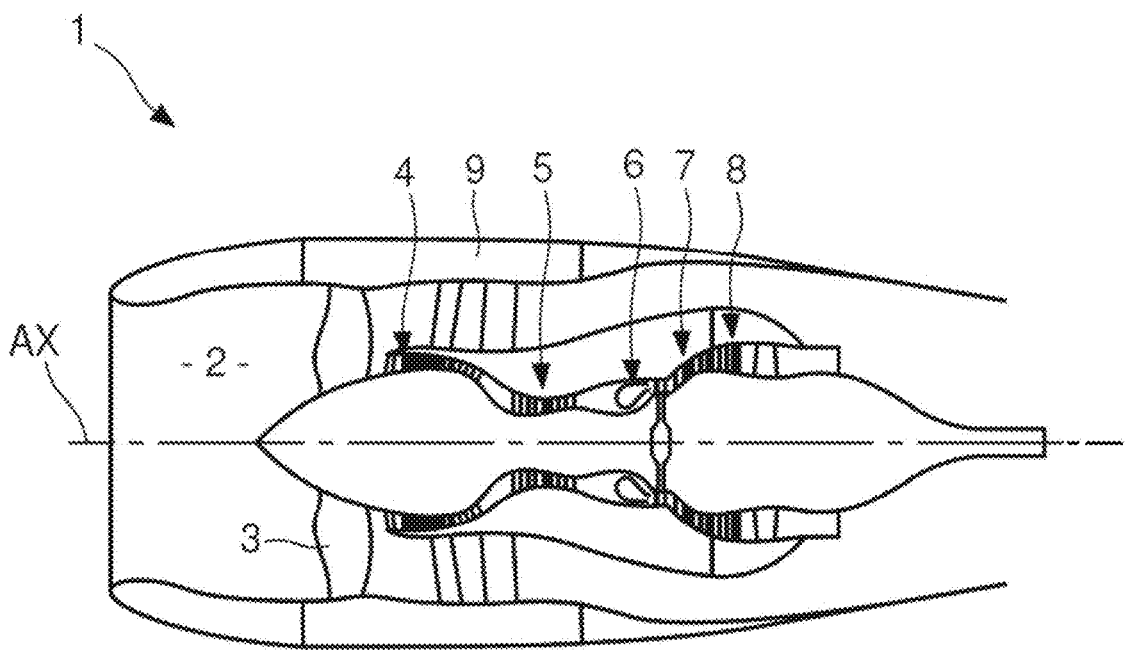
FIG. 1 is a longitudinal sectional view of a known bypass turbojet engine.
Figure 2:
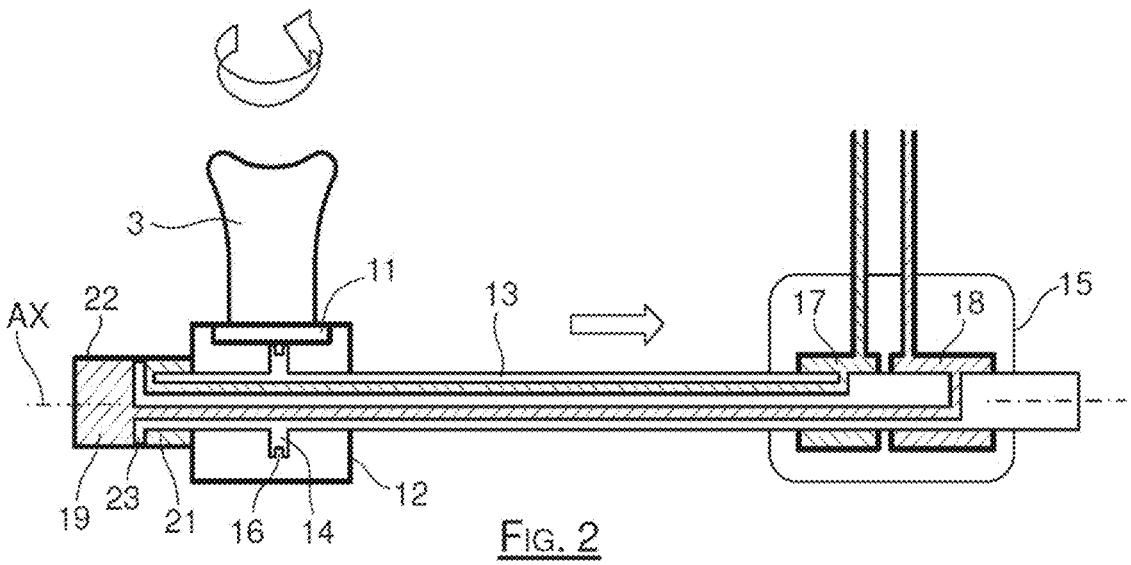
FIG. 2 is a schematic view of a known hydraulic system for adjusting the setting of the fan blades.
Figure 3:
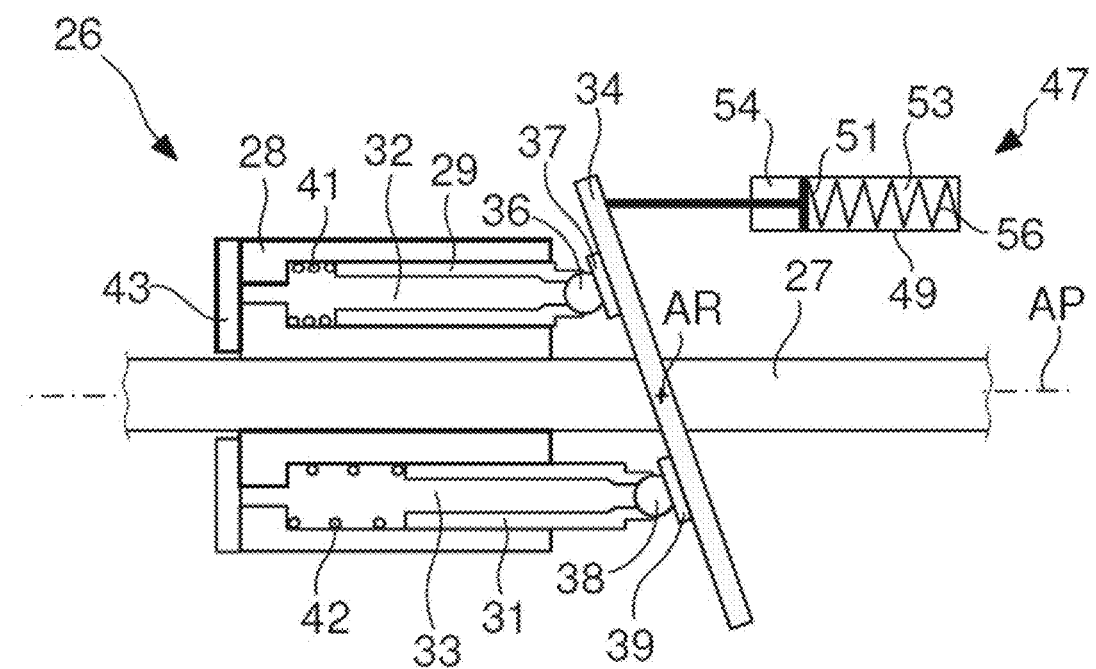
FIG. 3 is a longitudinal sectional view schematically representing a variable-displacement axial piston pump.

In FIG. 3, an axial piston pump 26 includes a drive shaft 27 which is rotated by a shaft of the turbojet engine that this pump equips. This shaft 27 rotates about an axis AP and it carries a barrel 28 to which it is rigidly secured, this barrel here carrying two pistons 29, 31. The piston 29 is slidably mounted in a corresponding cylindrical chamber 32 of the barrel 28 to be movable in translation in this chamber in the direction AP. The piston 31 is, in the same way, slidably mounted in another cylindrical chamber 33 of the barrel 28.

This pump also includes a swash plate 34 which is carried by fixed elements of the pump 26 while being capable of pivoting about an axis of rotation AR normal to the axis AP.

The piston 29 includes a free end protruding from the barrel 28 which is equipped with a ball 36 bearing on the plate 34 via a pad 37. In the same manner, the piston 31 includes a free end equipped with a ball 38 bearing on the plate 34 via another shoe 39.

As shown in FIG. 3, a return spring 41 located in the chamber 32 continually tends to remove the piston 29 from this chamber so that the free end thereof is all the time kept plated on the plate 34. Similarly, another return spring 42 is arranged in the chamber 33 to keep the end of the piston 31 plated on the plate 34.

Figure 4:
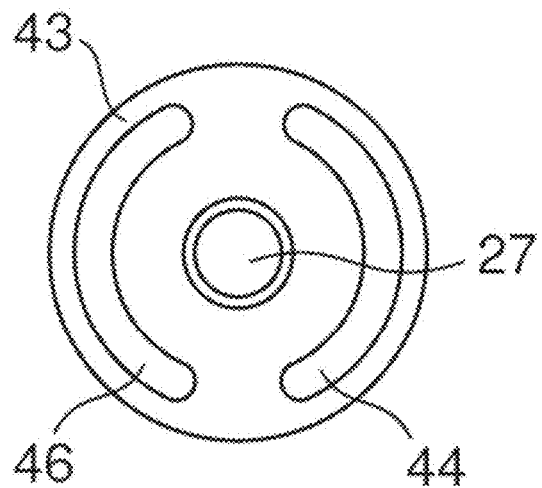
FIG. 4 is a front view of a variable-displacement axial piston pump valve plate.

This pump also includes a valve plate 43 attached to the face of the barrel 28 which is opposite to the pistons along the axis AP. This valve plate 43 which is a fixed element of the pump, and which appears alone in FIG. 4, is crossed by the shaft 27 and includes an oil intake port 44 in the shape of an arc of a circle extending over a little less than half a turn, and an oil discharge port 46 also extending over a little less than a half turn while being disposed diametrically opposite to the intake port 44.

As shown in FIG. 3, each chamber 32, 33 is terminated, on the side opposite to the piston it houses, by a channel passing through the barrel to be able to be communicated with any of the ports 44, 46 of the valve plate 43.

The intake port 44 is connected to a pump supply oil reservoir, at atmospheric pressure, and the discharge port 46 is connected to an outlet conduit of the pump.

In operation, the rotation of the barrel 28 about the axis AP generates an alternating movement of the pistons 29 and 31 whose ends are held bearing on the plate 34. In this movement, each piston extends to suck in oil throughout the phase of rotation where the chamber thereof communicates with the port 44, and it is retracted to discharge pressurised oil through the port 46 throughout the phase where the chamber thereof communicates with this other port 46.

In the example of FIG. 3, only two pistons with their housings are represented, but such a pump 26 generally includes a greater number of axial pistons housed in the barrel thereof, such as for example five, seven or nine pistons.

As shown in FIG. 3, the tilt of the plate 34 conditions the movement stroke of each piston, such that the adjustment of this tilt allows adjusting the displacement of the pump, that is to say its flow rate per barrel revolution.

To this end, the tilt of the plate 34 is adjustable by means of a control and compensation cylinder 47 which extend parallel to the axis AP and at a distance therefrom. The plate 34 is, in turn, tiltably mounted about an unmarked axis which intersects the axis AP while being oriented perpendicular to a plane passing through the axis AP and through the cylinder 47.

The cylinder 47 includes a body 49 in which slides a rod terminated by a plate 51 separating this body 49 into a control chamber 53 which is opposite to the rod, and a compensation chamber 54 crossed by this rod. A return spring 56 is housed in the control chamber, this spring 56 having one end bearing on the plate and the other end thereof bearing on the bottom of the body 49. This spring 56 continually tends to deploy the cylinder, to extend the rod thereof, and this rod has the free end thereof bearing on one face of the plate 34.

The compensation chamber 54 of the cylinder 47 is pressurised by an oil tap leaving the pump 26, such that it is continuously at the outlet pressure of the pump 26.

When the pump starts, the chambers 53 and 54 are not pressurised, but the spring 56 pushes the rod of the cylinder 47 so that it extend, such that the plate 34 is tilted so that the pump generates a flow rate when it starts. This flow rate has the effect of pressurising the chamber 54, tending to retract the cylinder 47 to reduce the tilt of the plate.

In an antagonistic manner, the control chamber 53 is pressurised to another pressure value, such that once in service, the pump rotates with a flow rate value, resulting from the tilt of its plate, which is conditioned by the pressures prevailing in the two chambers 53 and 54. When the pump is stopped, the chambers 53 and 54 are depressurised, and the plate returns to a tilted position due to the return spring 56.

In practice, the control chamber 53 of the cylinder 47 is also pressurised with a pressure corresponding to the outlet pressure of the pump. Due to the presence of the rod passing through the compensation chamber 54, the useful section of the chamber 54 is less than the useful section of the chamber 53.

Under these conditions, when the two chambers 53 and 54 are supplied at the same pressure, the rod of the cylinder 47 tends to be deployed to increase the tilt of the plate 34: for the same supply pressure of the chambers 53 and 54 the plate takes a certain tilt to which a certain flow rate of the pump corresponds.

When the pressure increases at the pump outlet, it also increases in the chambers 53 and 54, and this increase causes an increase in the tilt of the plate to increase the flow rate of the pump. In other words, the tilt of the plate 34 relative to a plane normal to the axis AP is all the greater as the supply pressure of the chambers 53 and 54 is high.

Figure 5:
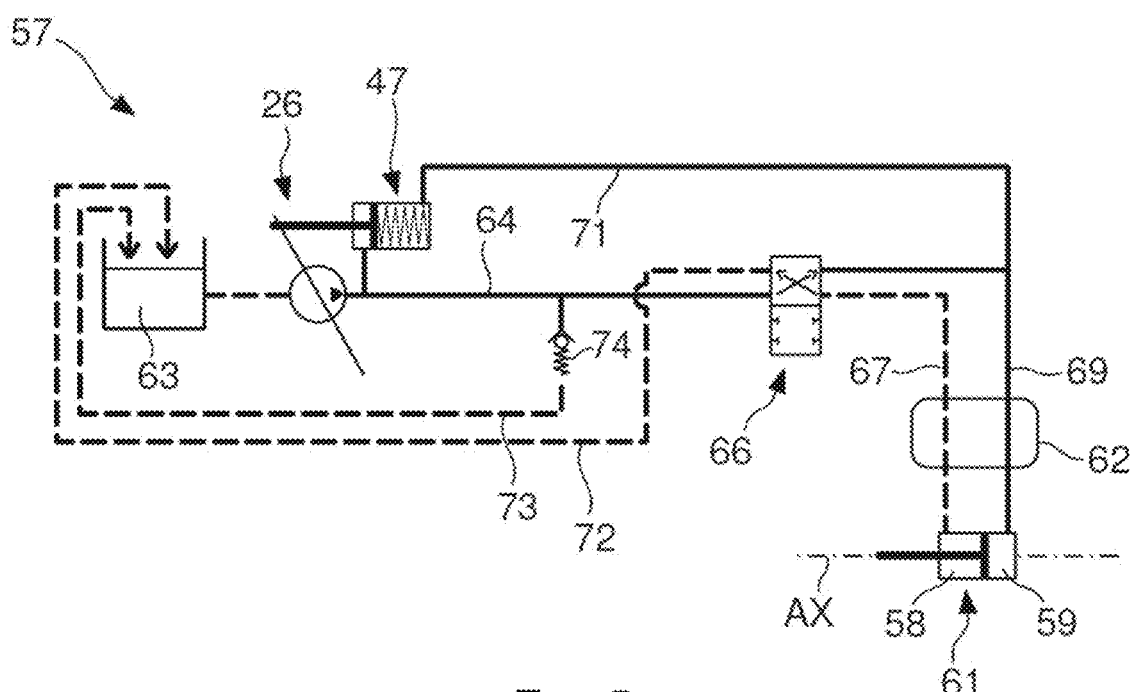
FIG. 5 is a schematic view of the control circuit according to the invention when the dispensing valve thereof occupies a first position.

The variable-displacement axial piston pump 26 is integrated into the control circuit 57 represented in FIG. 5, to ensure the pressurisation of a first upstream chamber 58 or a second downstream chamber 59 of an orientation cylinder 61 acting on the longitudinal position of a central shaft of a motor. This allows maintaining the vanes at a predetermined setting angle by maintaining this shaft at a given position and changing the setting angle of these vanes by moving this shaft.

This cylinder 61 is carried by the central shaft which rotates while being powered by the control circuit which is carried by fixed elements of the motor, thanks to a hydraulic transfer bearing 62 surrounding the central shaft, this bearing being the seat of hydraulic leaks.

As shown in FIG. 5, this circuit 57 includes an oil tank 63 which is connected to the pump 26 to supply it, and the pump 26 has the outlet thereof connected to a supply pipe 64 which is connected to a dispensing valve 66 in two positions. The compensation chamber 54 is pressurised to the outlet pressure of the pump by being connected to the pipe 64 via a tap.

This dispensing valve 66, which here is a dispenser drawer, is connected to a first chamber of the transfer bearing 62 via an upstream pipe 67, and this first chamber of the bearing 62 directly supplies the first chamber 58 of the orientation cylinder 61.

The dispensing valve 66 is connected to a second chamber of the transfer bearing 62 via a downstream pipe 69, and this second chamber of the bearing 62 directly supplies the second chamber 59 of the cylinder 61. This downstream pipe 69 is further connected, via a control pipe 71, to the chamber 54 of the cylinder 47.

In the situation of FIG. 5, the dispensing valve 66 occupies a first position corresponding for example to a cruise flight situation. The schematic representation of this valve 66 in the figure shows in this first position a crossing of the two fluid circuits inside the valve between the two inlets and the two outlets of the valve body. It is understood that alternatively, it is possible to provide for the two fluid circuits to be arranged substantially parallel to each other inside the valve, such that each fluid circuit represented by an arrow connects an inlet or an outlet of the valve at the inlet or the outlet which is arranged substantially opposite. In this alternative, the connections between the two outlets of the valve 66 and the upstream pipe 67 as well as the downstream pipe 69 must be switched accordingly relative to the diagram in FIG. 5. In particular, the outlet of the valve 66 connected to the downstream pipe 69 will then be found substantially opposite to the inlet of the valve which is connected to the supply pipe 64.

The dispensing valve 66 connects, on the one hand, the outlet of the pump 26 to the second chamber 59 of the cylinder 61 and to the chamber 53 of the control cylinder 47, and on the other hand, a bleed pipe 72 to the first chamber 58 of the cylinder 61 and to the chamber 54 of the control cylinder 47. This bleed pipe 72 opens into the tank 63 which can possibly be pressurised.

In this situation in FIG. 5, the forces exerted from upstream to downstream by the fan vanes on the rod of the cylinder 61 are compensated by the pressurisation of the second chamber 59, the upstream chamber 58, in turn, not being pressurised.

More particularly, an increase in the force exerted by the vanes on the rod of the cylinder 61 tends to move this rod to retract it into the cylinder body, which has the effect of increasing the pressure in the second chamber 59 of this cylinder. This increase in pressure is reflected in the chambers 53 and 54 of the control cylinder 47, due to the fact that it is connected to this second chamber 59 and to the pipe 64, which causes an increase in the tilt of the plate 34, which consequently increases the flow rate delivered by the pump 26.

The increase in the output flow rate of the pump 26 allows increasing the pressure in the chamber 59 to compensate for the increase in the force exerted by the vanes as well as the increase in the leaks in the bearing 62 resulting from the increase in pressure.

Similarly, a reduction in the force exerted by the vanes on the orientation cylinder 61 tends to cause the rod of the cylinder 61 to extend, resulting in a reduction in the pressure in the chamber 59. This reductions reflected in the chambers 53 and 54 of the cylinder 47, which causes a reduction in the tilt of the plate, and thereby a reduction in the flow rate of the pump resulting in a reduction in the pressure in the chamber 59 and a reduction in the losses in the bearing 62 as a result of the reduction in pressure.

As can be understood, the hydraulic control circuit 57 thus allows automatically regulating the pressure in the orientation cylinder 61 to continually adapt it to the value of the forces exerted by the fan vanes.

Thus, the setting of the blades does not change when the forces they exert (which correspond to the aerodynamic forces they undergo) fluctuate, and the used control pressure is as low as possible since it is continually adjusted to this force. This allows limiting the consumption of the pump, and thereby optimising the efficiency of the motor.

As shown in FIG. 5, the circuit 57 also includes a bleed pipe 73 of the supply pipe 64 which connects the latter to the tank 63, and which includes a check valve 74 which is here a ball valve. Thus, in the case of excessive pressure in the supply pipe 64, this is immediately reduced by discharging a portion of the oil it contains into the tank 63, as soon as the pressure in this supply pipe becomes greater than the threshold pressure of the valve 74.

Figure 6:
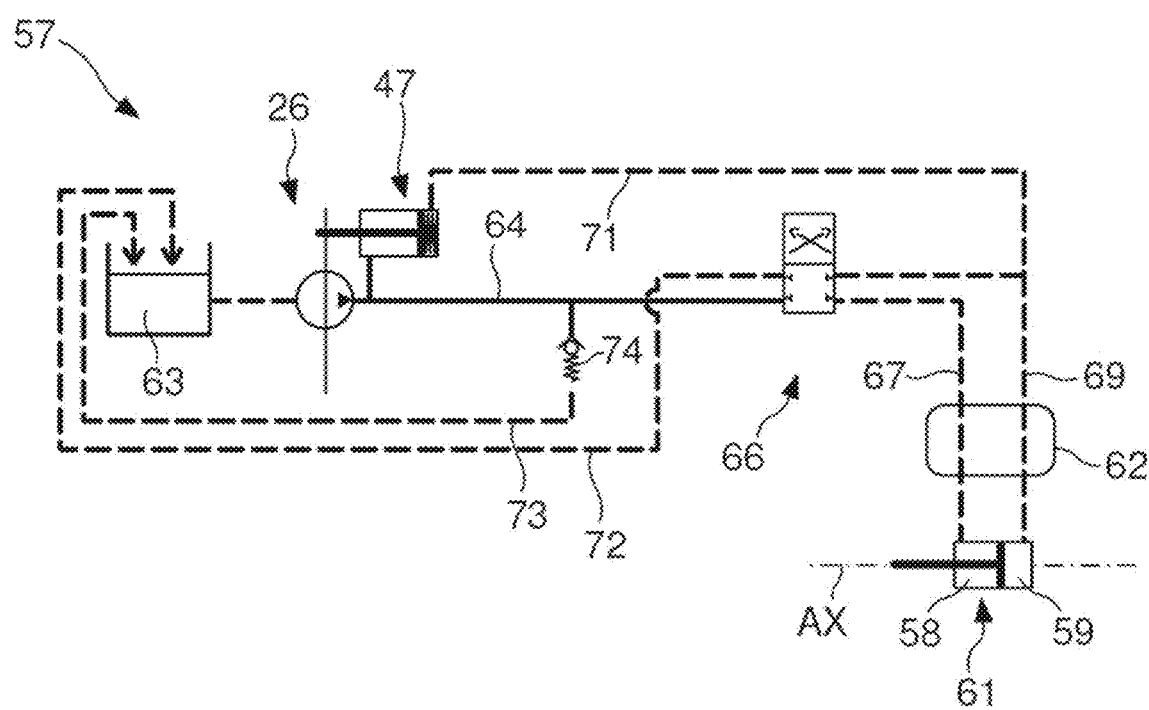
FIG. 6 is a schematic view of the control circuit according to the invention when the dispensing valve thereof occupies a second position.

The dispensing valve 66 which occupies a first position in the configuration of FIG. 5 can also occupy a second position corresponding to FIG. 6, and in which it closes all communication between the supply pipe 64 and the cylinder 61, and any communication between the bleed pipe 72 and the cylinder 61.

When the dispensing valve 66 is switched from its first position to its second position, the pressures gradually lower in the upstream pipe 67 and in the downstream pipe 69 due to leaks in the transfer bearing 62. As a result, the pressure also drops in the control pipe 71 and therefore in the control chamber 53, while the pressure remains high in the compensation chamber.

Under these conditions, the plate 34 of the pump balances at an angular position close to the normal to the axis AP, the pump 26 then having a substantially zero flow rate. Given the leaks in the bearing 62, the cylinder 61 is not blocked, it is likely to be moved at a relatively slow speed if forces are applied thereto.

The control circuit has been described for an operation ensuring that the vanes are maintained at a given setting angle including when the forces undergone and exerted by these vanes fluctuate, while generating a minimum pressure, that is to say necessary and sufficient to ensure they remain in the given position.

This control circuit 57 also allows changing the setting angle of the vanes. More particularly, the dispensing valve 66 which has been described according to an "all-or-nothing" type operation is advantageously a progressive type valve to suit a concrete application.

When this valve 66 is in its first position, it can further be controlled to provide the fluid with a more or less large passage section. If it is controlled to offer a maximum passage section, the entire flow delivered by the pump is transferred to the chamber 59, such that the pressure in this chamber reaches a value which is greater than that necessary to balance the force exerted by the vanes, which causes a movement of the cylinder which is deployed, thereby modifying the setting angle of the blades.

In the first position, if the valve is controlled to offer the fluid a partial passage section, corresponding to a predetermined value, the flow rate transferred to the chamber 59 is lower, to generate in the chamber 59 a pressure value which can be provided just sufficient to balance the forces exerted by the vanes, so as to only ensure their maintenance at the setting angle that they occupy.

Controlling and driving the dispensing valve are ensured from a motor computer (Fadec) which continually adjusts the signals sent to this valve depending on the motor operating conditions.

Generally speaking, the invention allows regulating the back pressure of the variable-displacement axial piston pump with a pressure which depends on the forces applied to the blade setting control cylinder, instead of regulating it at a high fixed value. It was explained in the context of controlling variable-setting fan blades of a turbojet engine, but it can be applied to the system for controlling variable-setting blades of other types of motors such as turboprop engines.

The invention claimed is:

1. A hydraulic control circuit of a double-acting orientation cylinder to orient fan vanes of a turbojet engine, the hydraulic control circuit comprising:
   an oil tank,
   a variable-displacement axial piston pump including a swash plate controlled by a double-acting control and compensation cylinder comprising a control chamber and a compensation chamber,
   the double-acting orientation cylinder having a first chamber connected to the tank, the pump being supplied by the oil tank and having an outlet thereof configured to be able to be connected to a second chamber of the orientation cylinder via a supply pipe, the chambers of the control and compensation cylinder both being pressurised with a pressure corresponding to a pump outlet pressure,
   wherein the control and compensation chambers are arranged to increase a tilt of the swash plate in order to increase a displacement of the pump when pressures within each of the control and compensation chamber are increased, and wherein
   the pump has the outlet thereof connected, via the supply pipe, to a dispensing valve connected to the first and second chambers of the orientation cylinder, wherein the compensation chamber of the control and compensation cylinder is connected to the outlet of the pump, wherein the control chamber of the control and compensation cylinder is connected to the second chamber of the orientation cylinder, wherein the dispensing valve can occupy a position in which it connects, on the one hand, the supply pipe to the second chamber of the orientation cylinder, and on the other hand, the first chamber of the orientation cylinder to the tank.

2. The circuit according to claim 1, wherein the dispensing valve is configured to occupy a position in which the pump and the tank are isolated from the first and second chambers of the orientation cylinder.

3. The circuit according to claim 1, comprising a bleed pipe connecting the supply pipe to the tank via a check valve.

4. The circuit according to claim 1, wherein the control chamber has a larger useful section than the compensation chamber.

5. A turbojet engine comprising a circuit according to claim 1 and variable-setting fan blades which are controlled with the circuit.

* * * * *